United States Patent
Hasegawa et al.

[11] Patent Number: 6,062,572
[45] Date of Patent: May 16, 2000

[54] METAL GASKET

[75] Inventors: Keiichi Hasegawa, Tokyo; Toshiaki Katsumata, Kanagawa-ken; Atsushi Suzuki, Kanagawa-ken; Yukitomo Matsumoto, Kanagawa-ken; Namieki Osawa, Kanagawa-ken; Hideki Muramatsu, Kanagawa-ken, all of Japan

[73] Assignee: Ishino Gasket Mfg. Co., Ltd., Tokyo, Japan

[21] Appl. No.: 09/025,955

[22] Filed: Feb. 19, 1998

Related U.S. Application Data

[63] Continuation-in-part of application No. 08/804,178, Feb. 21, 1997, abandoned.

[30] Foreign Application Priority Data

Feb. 24, 1997 [JP] Japan ................................. 9-054249

[51] Int. Cl.$^7$ .......................................................... F02F 11/00
[52] U.S. Cl. ............................................. 277/592; 277/593
[58] Field of Search .................................... 277/592, 593, 277/594, 595

[56] References Cited

U.S. PATENT DOCUMENTS

| | | | |
|---|---|---|---|
| 4,140,323 | 2/1979 | Jacobs | 277/594 |
| 4,519,619 | 5/1985 | Doyle | 277/594 |
| 5,150,910 | 9/1992 | Udagawa | 277/592 |
| 5,582,415 | 12/1996 | Yoshida et al. | 277/595 X |
| 5,700,015 | 12/1997 | Tensor | 277/591 |

*Primary Examiner*—Anthony Knight
*Assistant Examiner*—Karlena D. Schwing
*Attorney, Agent, or Firm*—Goodman & Teitelbaum, Esqs.

[57] ABSTRACT

A metal gasket including a thin metal plate (1) provided with beads (3) and step members (4) each of which includes a coating layer having a property of high load resistance. The step member (4) is attached to the bead along a convex ridge of the bead (3), thereby increasing a quantity of compression of the bead (3), to cause a great surface pressure and decreasing an amplitude of stress in the bead (3) to improve a property of fatigue resistance of the bead (3). Also, the step member (4) is attached to the bead within a concave surface of the bead, thereby restraining the quantity of compression of the bead (3) to improve the property of fatigue resistance of the bead (3) and assuring the surface pressure on the concave surface of the bead by the step member (4).

8 Claims, 4 Drawing Sheets

METAL GASKET

This application is a continuation-in-part of application Ser. No. 08/804,178, filed Feb. 21, 1997, now abandoned.

BACKGROUND OF THE INVENTION

This invention relates to a metal gasket and particularly relates to a metal gasket provided with a bead or beads.

Recently, a requirement for a gasket has become severe in association with enhancement of performance in a modem internal combustion engine. The gasket is required to be thinner in thickness and higher in gas-sealing function to cope with a higher inner pressure in engines.

In reply to the requirement, a metal gasket has been proposed which uses a thin metal plate in which a sealing line with a greater surface pressure is provided around an opening therein by effecting a grommet working, a seam welding, or a bead forming, or by attachment of a resilient seal member in order to assure a gas-sealing function.

However, a metal gasket, on which a grommet is welded, can have a sealing line only a limited position such as a periphery of the opening, cannot support the grommet on account of lack of a sealing width in the case where a flange is narrow, and cannot have a quantity of step difference less than a thickness of the grommet since the quantity of step difference is determined by the thickness of the grommet. On the other hand, although a metal gasket with beads can be advantageously formed into a thin thickness, breakage of sealing will be readily caused due to a collapse of the bead, since a surface pressure to be exerted in the gasket is determined by a dimension and a shape of the bead. The metal gasket with the resilient seal member requires a design of the number and shape of the resilient seal member for every type of gasket since it is difficult to control a quantity of compression of the resilient seal member. This is troublesome. Such metal gasket is poor in durability since it is subject to a great secular change. Further, it is likely to lose a gas-sealing function due to separation upon mechanical vibrations.

Another metal gasket in which a resilient seal member is attached to a bead has been proposed in order to improve a property of fatigue resistance of the bead. Although such metal gasket can maintain a desired surface pressure on a convex surface of the bead, the gasket cannot assure a desired sealing surface pressure on a concave surface of the bead, since a fastening load on the concave surface of the bead is distributed on three positions, that is, the resilient seal member and a pair of standing portions of the bead.

SUMMARY OF THE INVENTION

An object of the present invention is to provide a metal gasket which can obtain a gas-sealing function for a high inner pressure even if the gasket is thin in thickness, has superior durability by improving a property of fatigue resistance of a bead, can suppress a deformation of a flange upon attachement as little as possible by causing a small fastening force and a high inner pressure, and can be inexpensively produced by a mass production process.

In order to achieve the above object, a metal gasket of the present invention comprises: at least a sheet of thin metal plate provided with at least one bead; and a step member attached to each bead and including a coating layer having a property of high load resistance.

The metal gasket of the present invention assures a sealing surface pressure by concentrating a fastening load on a position where the step member is disposed, reduces a load stress in the bead, and improves a property of fatigue resistance of the bead by completely compressing the bead to reduce an amplitude of stress of the bead or by restraining a quantity of compression of the bead.

In the metal gasket of the present invention, the step member may be attached to the bead in a top area on a convex surface of the bead. The metal gasket of the present invention reduces the amplitude of stress of the bead to improve the property of fatigue resistance, assures a surface pressure on the convex surface of the bead by means of the step member, and assures a surface pressure on the concave surface of the bead by means of a reaction force of the bead compressed completely.

In the metal gasket of the present invention, the step member may be attached to the bead in a thickness area on a concave surface of the bead. The metal gasket of the present invention restrains a quantity of compression of the bead to improve the property of fatigue resistance of the bead and assures a surface pressure on the concave surface of the bead by means of the step member.

In the metal gasket of the present invention, the step member may be attached to the bead in the top area on the convex surface of the bead and in the thickness area on the concave surface of the bead. The metal gasket of the present invention improves the property of fatigue resistance of the bead and assures the surface pressures on the convex and concave surfaces of the bead.

A metal gasket of the present invention may comprise: at least two sheets of thin metal plate piled on each other at upper and lower sides, each metal plate being provided on a given position or positions with at least one bead, the beads of the metal plates being opposed at the respective corresponding positions; and a step member attached to each bead at a given position and including a property of high load resistance. The step member is disposed in a given area defined between a concave surface of the upper bead of the upper metal plate and a convex surface of the corresponding lower bead of the lower metal plate.

Since the step member serves to reduce or restrain the quantity of compression of the bead of the upper thin metal and to increase the quantity of compression of the bead of the lower thin metal plate, it is possible to enhance the property of fatigue resistance and the surface pressures on the convex and concave surfaces of the bead.

In the metal gasket of the present invention, the step member may be made of a material composed of at least one selected from a synthetic resin, an inorganic substance, and a metal powder or a composite material composed of at least one selected from a synthetic resin, an inorganic substance, and a metal powder as a main component. It is possible to surely provide on the bead the step member having a given thickness and a given pattern by means of a conventional printing, metal spray, or dispenser process and to enhance a mass production process and to lower a cost of production.

In the metal gasket of the present invention, the step member may be covered with a rubber-coating. The metal gasket assures a gas-sealing function between the flanges.

In the metal gasket of the present invention, a thickness of the rubber-coating may be less than a thickness of the step member. Consequently, an elasticity of the rubber-coating does not harm the quantity of compression of the bead.

DETAILED DESCRIPTION OF THE PREFERRED EMBODIMENTS

Figure 1:
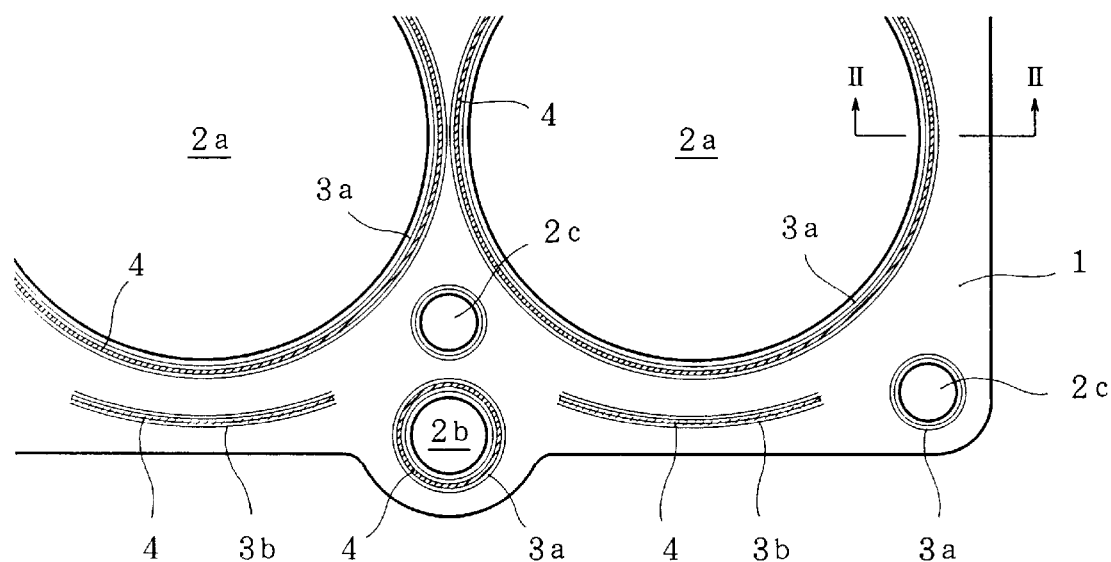
FIG. 1 is a partial plan view of a first embodiment of a metal gasket in accordance with the present invention.

Referring now to the drawings preferred, embodiments of a metal gasket in accordance with the present invention will be described below.

A first embodiment of the metal gasket of the present invention is explained by way of a gasket for a cylinder head in FIG. 1. The metal gasket is made of a single thin metal plate 1 in which openings 2a for cylinder bores, apertures 2b for oil passages, apertures 2c for bolts, and the like are provided. A bead 3a is formed around each of the openings 2a and apertures 2b and 2c while a bead 3b is formed around each portion which requires a raise of a surface pressure.

A step member 4 including a coating layer having a property of high load resistance is attached to each of the desired beads 3a and /or 3b (if necessary, all beads 3a and 3b).

Figure 2:
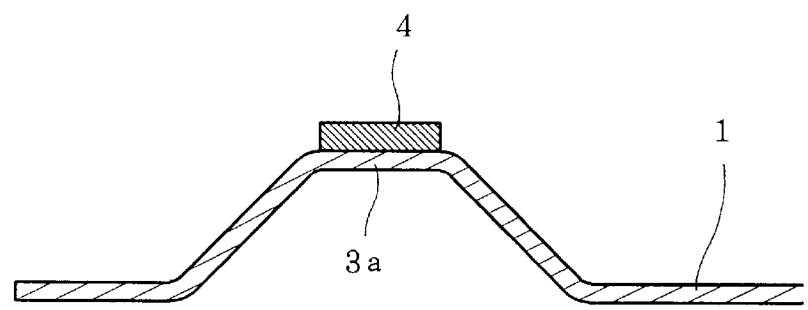
FIG. 2 is an enlarged cross sectional view taken along line II—II in FIG. 1.
Figure 3:
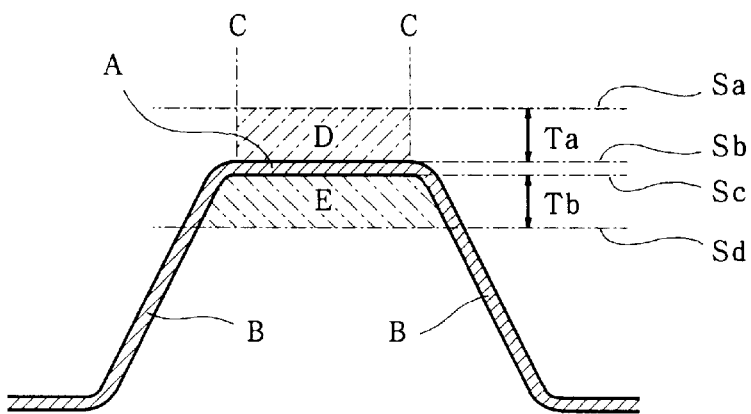
FIG. 3 is an enlarged cross sectional view of a part of the metal gasket shown in FIG. 1, illustrating a "top area" and a "thickness area"
Figure 4:
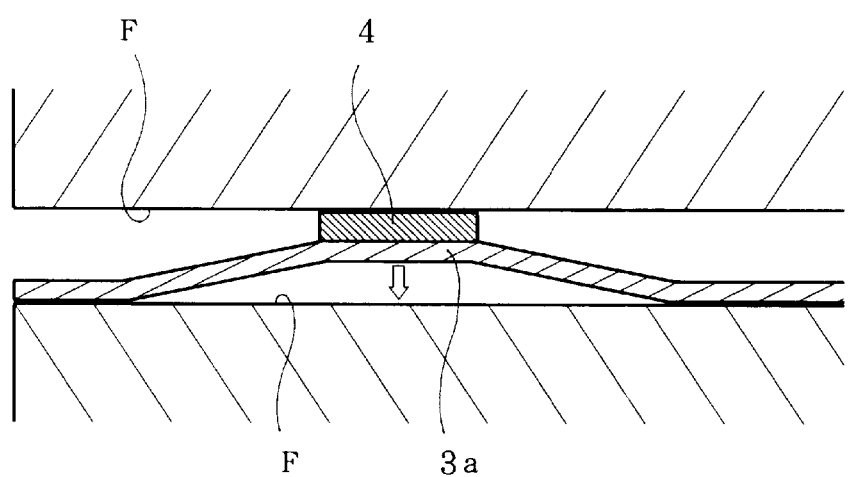
FIG. 4 is an enlarged cross sectional view of a bead shown in FIG. 2, illustrating the bead disposed between flange surfaces.

The step member 4, as shown in FIG. 2, is attached to the bead 3a in a top area D (see FIG. 3) on or along a convex surface or ridge of the bead 3a (or 3b). When the metal gasket is disposed between flanges F, as shown in FIG. 4, the step member 4 compresses the bead completely to reduce an amplitude of stress in the bead and at the same time induces a maximum reaction force of the bead to generate a great surface pressure. The "top area" means an area D defined, as shown in FIG. 3, by a length between transition points C changing from a top portion A of the bead to a ramp portion B of the bead and by a height Ta corresponding to a thickness of the step member between a convex surface Sb of the top portion A of the bead and a boundary surface Sa. The thickness Ta of the step member is determined by a desired surface pressure.

Since the step member 4 is disposed in the top area D, the step member 4 does not interfere with deflections of the ramp portions B of the bead, which exerts the surface pressure on the bead when compressed. Consequently, a stress exerted in the bead is not subject to an influence due to the step member and the deflections of the beads can apply the minimum load to the step member 4. The coating layer forming the step member 4 may be made of a material having a property of high load resistance. Preferably, the coating layer is made of a material composed of at least one selected from a synthetic resin, an inorganic substance, and a metal powder or a composite material composed of at least one selected from a synthetic resin, an inorganic substance, and a metal powder as a main component. The coating layer may be attached to the bead by means of a well known printing, metal spray, or dispenser process in order to assure a given thickness and a given pattern and a mass production process.

The synthetic resin suitable for forming the coating layer by utilizing the means of the printing or dispenser process may be an epoxy resin, a polyamide, a polyimide, or the like.

The inorganic substance for the coating layer may be a glass fiber, a glass powder, a ceramic powder, or the like. The metal powder for the coating layer may be a stainless chip, an aluminum powder, or the like. The metal suitable for the metal spray process may be a steel, an aluminum, a copper, or the like.

Figure 5:
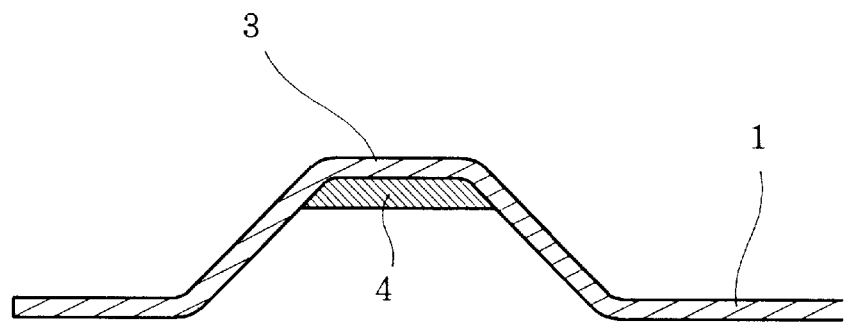
FIG. 5 is an enlarged cross sectional view similar to FIG. 2, illustrating a second embodiment of the metal gasket in accordance with the present invention.

FIG. 5 shows a second embodiment of the metal gasket of the present invention. This embodiment has the same structure as that of the first embodiment described above except an arrangement of the step member 4.

In this embodiment, the step member 4 is attached to the bead 3 in an thickness area E (see FIG. 3) on or within a concave surface or ridge of the bead 3. The "thickness area" means an area E defined, as shown in FIG. 3, by a height Tb corresponding to a thickness of the step member 4 between a concave surface (a rear side of the top portion A) Sc and a boundary surface Sd. The thickness Tb of the step member 4 is determined by a desired surface pressure. It should be noted that the step member 4 is attached to the rear side Sc of the top portion A between the transition points C in the thickness area E so that the step member 4 does not interfere with the deflections of the ramp portions B of the bead 3 when a fastening load is applied to the ramp portions B.

Figure 6:
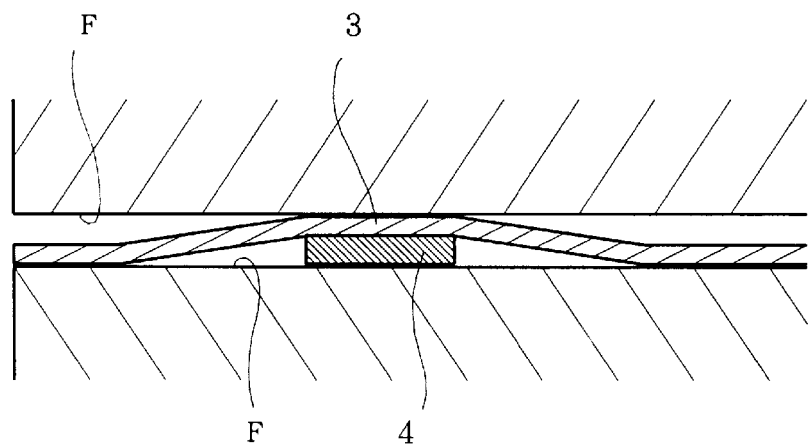
FIG. 6 is an enlarged cross sectional view of a bead shown in FIG. 5, illustrating the bead disposed between the flange surfaces.

When the metal gasket is disposed between the flanges F, as shown in FIG. 6, the step member 4 restrains a quantity of compression of the bead 3 to moderate a load stress in the bead and simultaneously the step member 4 serves as a concentration point of the fastening load on the concave surface Sc of the bead 3 so as to eliminate the lack of surface pressure due to distribution of the fastening load on the concave surface of the bead in the case of applying the conventional resilient seal member.

Figure 7:
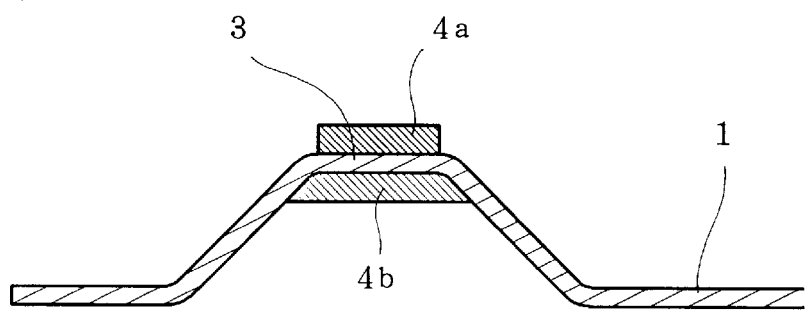
FIG. 7 is an enlarged cross sectional view similar to FIG. 2, illustrating a third embodiment of the metal gasket in accordance with the present invention.

FIG. 7 shows a third embodiment of the metal gasket of the present invention. This embodiment has the same structure as that of the first or second embodiment described above except that the step members 4a and 4b are attached to the bead 3 in the top area D on or along the convex surface or ridge and to the thickness area E on or within the concave surface or ridge, respectively.

The step member 4b restrains a quantity of compression of the bead 3 to moderate a load stress in the bead and at the same time the step member 4b serves as a concentration point of the fastening load on the concave surface of the bead, by the same manner as the step member 4 in the second embodiment described in association with FIGS. 5 and 6. On the other hand, the step member 4a compresses the bead to reduce an amplitude of stress and simultaneously induces a greater reaction force of the bead (the bead is compressed not completely but preferably by provision of the step member 4b), by the same manner as the step member 4 in the first embodiment described by referring to FIGS. 2 and 4. Consequently, the bead in this embodiment can enhance a property of load fatigue resistance of the bead and a surface pressure more greatly than the beads in the first and second embodiments mentioned above. Further, the step members 4a and 4b can precisely perform a desired distribution of surface pressure and can contribute to make a metal gasket having a high durability by adjusting a thickness of the step members 4a or 4b relative to each other.

Figure 8:
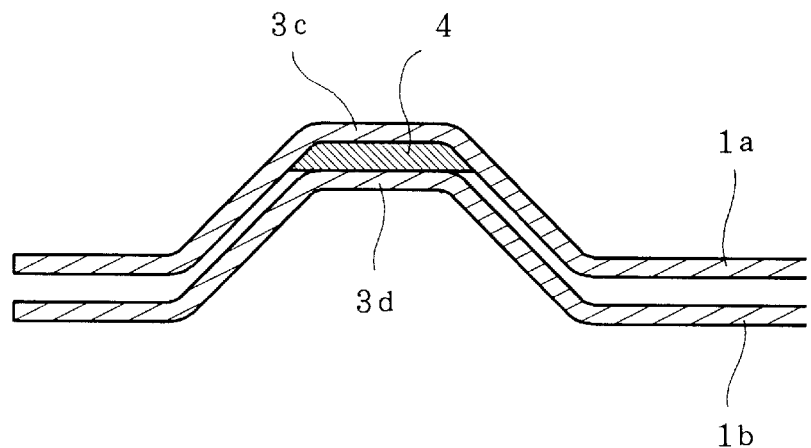
FIG. 8 is an enlarged cross sectional view similar to FIG. 2, illustrating a fourth embodiment of the metal gasket in accordance with the present invention.

FIG. 8 shows a fourth embodiment of the metal gasket in accordance with the present invention. In this embodiment, the metal gasket includes at least two sheets of thin metal plate 1a and 1b piled on each other at upper and lower sides. Each of the thin metal plates 1a and 1b is provided on a given position with at least one bead 3c or 3d. The beads 3c and 3d of the thin metal plates 1a and 1b are opposed rested or stacked at the respective corresponding positions. The same step member 4 as that in the above embodiments is interposed between the concave surface of the bead 3c of the upper thin metal plate 1a and the convex surface of the bead 3d of the lower thin metal plate 1b. The step member 4 is attached to the bead 3c in the thickness area E on or within the concave surface or ridge of the bead 3c or to the bead 3d in the top area D on or along the convex surface or ridge of the bead 3d by the same manner of the first or second embodiment described above.

It will be apparent from the explanations of the above embodiments that the step member 4 restrains a quantity of compression of the bead 3c of the upper thin metal plate 1a on account of disposing the step member 4 on the concave surface or ridge of the bead 3c and that the step member 4 increases a quantity of compression of the bead 3d of the lower thin metal plate 1b on account of disposing the step member on the convex surface or ridge of the bead 3d. Consequently, the step member 4 in this embodiment can perform a combination of operational effects obtained by the step members 4a and 4b described in the third embodiment shown in FIG. 7.

The step member 4 may be attached to either thin metal plate 1a or 1b in order to perform its operational effect. It will be preferable, however, to attach the step member 4 to the concave surface or ridge of the bead 3c of the upper thin metal plate 1a in order to prevent the step member 4 from being broken or separated during a process of piling the thin metal plates 1a and 1b onto each other or to easily form a given thickness and a desired pattern of the coating layer.

Figure 9:
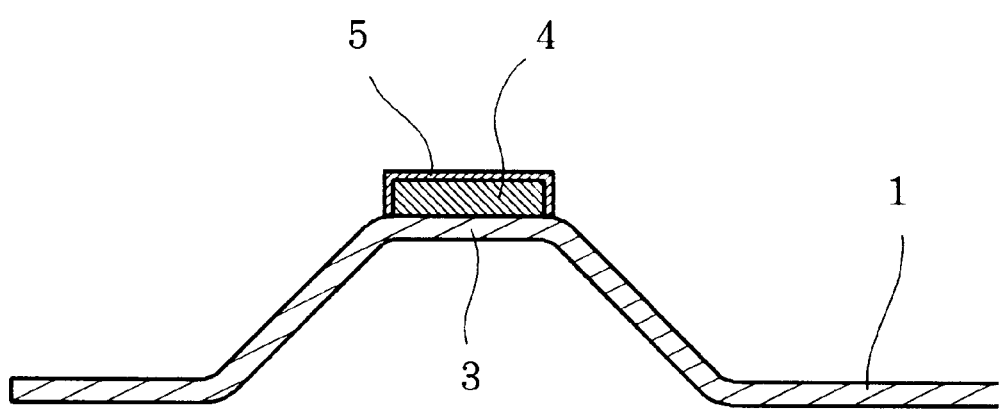
FIG. 9 is an enlarged cross sectional view similar to FIG. 2, illustrating a fifth embodiment of the metal gasket in accordance with the present invention.

FIG. 9 shows a fifth embodiment of the metal gasket in accordance with the present invention. This embodiment has the same structure as those of the embodiments described above except the step member 4 covered with a rubber-coating 5. Although the illustrated embodiment is based on the first embodiment shown in FIG. 2, this embodiment can be applied to the other embodiments shown in FIGS. 5, 7, and 8.

The rubber coating 5 is resiliently interposed between the step member 4 and the flange F to assure a gas-sealing function. However, it should be noted that a thickness of the rubber-coating 5 is considerably thin relative to a thickness of the step member 4 so that resilience of the rubber coating 5 does not interfere with increase or restraining of a quantity of compression of the bead. The rubber-coating 5 may be made of an NBR, a fluorine-contained rubber, a silicon rubber, or the like.

Although the bead is a trapezoidal full bead shape in the respective embodiments described above, the rubber-coating can be applied to the bead having any other shapes such as a semicircular shape, a triangular shape or the like.

According to the present invention, it is possible to assure a sealing surface pressure by concentrating a fastening load on a position where the step member is disposed and to reduce a load stress in the bead and improve a property of fatigue resistance of the bead by completely compressing the bead to reduce an amplitude of stress of the bead or by restraining a quantity of compression of the bead, in the case where the step member including a coating layer having a property of high load resistance is provided on the bead. It is also possible to reduce the amplitude of stress of the bead to improve the property of fatigue resistance, to assure a surface pressure on the convex surface of the bead by means of the step member, and to assure a surface pressure on the concave surface of the bead by means of a reaction force of the bead compressed completely, in the case where the step member is attached to the bead in the top area on or along the convex surface or ridge of the bead so as to increase the quantity of compression of the bead. In addition, it is possible to restrain the quantity of compression of the bead to improve the property of fatigue resistance of the bead and to assure a surface pressure on the concave surface of the bead by means of the step member, in the case where the step member is attached to the bead in the thickness area on or within the concave surface or ridge of the bead so as to restrain the quantity of compression of the bead. It is further possible to improve the property of fatigue resistance of the bead more effectively and to assure the surface pressures on the convex and concave surfaces of the bead, in the case where the step member is attached to the bead in the top area on or along the convex surface or ridge of the bead and in the thickness area on or within the concave surface or ridge of the bead.

In the case where the metal gasket includes two sheets of thin metal plate and the step member is interposed between the concave surface of the bead of the upper thin metal plate and the convex surface of the bead of the lower thin metal plate, since the step member serves to reduce or restrain the quantity of compression of the bead of the upper thin metal plate and to increase the quantity of compression of the bead of the lower thin metal plate, it is possible to enhance the property of fatigue resistance and the surface pressures on the convex and concave surfaces of the bead. It is also possible to attach the step member to a given position on the bead with a given thickness more easily and precisely by attaching the step member to the bead in the thickness area on or within the concave surface or ridge of the bead of the upper thin metal plate.

In addition, by forming the step member from a material composed of at least one selected from a synthetic resin, an inorganic substance, and a metal powder or a composite material composed of at least one selected from a synthetic resin, an inorganic substance, and a metal powder as a main component, it is possible to surely provide on the bead the step member having a given thickness and a given pattern by means of a conventional printing, metal spray, or dispenser process and to enhance a mass production process and to lower a cost of production. It is further possible to assure a gas-sealing function between the flanges without harming the quantity of compression of the bead by covering the step member with a thin rubber-coating.

The entire disclosure of Japanese Patent Application No. H9 (1997)-54249 filed on Feb. 24, 1997 including specification, claims, drawings and summary is incorporated herein by reference in its entirety.

What is claimed is:

1. A metal gasket comprising:
   at least a sheet of thin metal plate provided with at least one bead, said one bead including a pair of first and second ramp portions extending upwardly from said metal plate and a top portion connected between upper edges of said first and second ramp portions;

resistance means attached to said one bead for providing said one bead with a high load resistance when said one bead is being compressed, and also providing said one bead with a selected surface pressure;

said resistance means being at least one step member including a coating layer fabricated from a material having a property of high load resistance;

said one step member being attached only to said top portion of said one bead to avoid interfering with deflections of said first and second ramp portions of said one bead when said one bead is being compressed; and said one step member having a thickness measured outwardly from said top portion of said one bead, said thickness of said one step member being determined by said selected surface pressure which varies proportionally to predetermined thicknesses of said one step member.

2. A metal gasket according to claim 1, wherein said one step member is attached to said one bead along a convex ridge of said one bead.

3. A metal gasket according to claim 1, wherein said one step member is attached to said one bead within a concave ridge of said one bead.

4. A metal gasket according to claim 1, wherein said one step member is attached to said one bead along a convex ridge of said one bead, and a second step member is attached to said one bead within a concave ridge of said one bead, said second step member having same properties as said one step member including a second coating layer fabricated from material having said property of high load resistance.

5. A metal gasket comprising;

at least two sheets, each of said two sheets being fabricated from a thin metal plate, said two sheets being disposed on each other at upper and lower sides, each of said two sheets being provided on a given position or positions with at least one bead, said beads of said two sheets being stacked at respective corresponding positions;

each of said beads including a pair of first and second ramp portions extending upwardly from each of said two sheets, respectively, and a top portion connected between upper edges of associated ones of said first and second ramp portions;

resistance means attached to each of said beads for providing said beads with a high load resistance when said beads are being compressed, and also providing each of said beads with a selected surface pressure;

said resistance means being at least one step member including a coating layer fabricated from a material having a property of high load resistance;

said one step member being attached only to said top portion of each of said beads to avoid interfering with deflections of said first and second ramp portions of each of said beads when said beads are being compressed;

said one step member being disposed in a given area defined between a concave ridge of an upper one of said beads on an upper one of said two sheets and a convex ridge of a lower one of said beads on a lower one of said two sheets; and said one step member having a thickness measured between said beads, said thickness of said one step member being determined by said selected surface pressure which varies proportionally to predetermined thicknesses of said one step member.

6. A metal gasket according to any one of claims 1, 2, 3, 4, 5, wherein said one step member is made of a material composed of at least one selected from a synthetic resin, an inorganic substance, and a metal powder or a composite material composed of at least one selected from a synthetic resin, an inorganic substance, and a metal powder as a main component.

7. A metal gasket according to claim 6, wherein said one step member is covered with a rubber-coating.

8. A metal gasket according to claim 7, wherein a thickness of said rubber-coating is less than a thickness of said one step member.

* * * * *